United States Patent [19]

Bott

[11] 4,342,411
[45] * Aug. 3, 1982

[54] VEHICLE LUGGAGE RACK

[76] Inventor: John A. Bott, 931 Lakeshore Dr., Grosse Pointe Shores, Mich. 48236

[*] Notice: The portion of the term of this patent subsequent to Jun. 23, 1998, has been disclaimed.

[21] Appl. No.: 204,478

[22] Filed: Nov. 6, 1980

Related U.S. Application Data

[63] Continuation of Ser. No. 13,524, Feb. 21, 1979, abandoned.

[51] Int. Cl.³ ............................................. B60R 9/04
[52] U.S. Cl. ................................... 224/319; 224/324; 224/326
[58] Field of Search .................. 224/309, 314–321, 224/324–328; 280/179 R, 179 B; 248/187

[56] References Cited

U.S. PATENT DOCUMENTS

| Re. 26,539 | 3/1969 | Bott | 224/321 |
| 3,223,301 | 12/1965 | Helm | 224/326 |
| 3,223,302 | 12/1965 | Helm | 224/326 X |
| 3,724,730 | 4/1973 | Olsen et al. | 224/309 |
| 4,274,570 | 6/1981 | Bott | 224/326 X |

FOREIGN PATENT DOCUMENTS 713791  8/1954  United Kingdom ............... 224/321

Primary Examiner—Stephen Marcus
Attorney, Agent, or Firm—Harness, Dickey & Pierce

[57] ABSTRACT

A vehicle luggage carrier is disclosed which includes a plurality of four stanchion members located one at each of the four corners of the luggage carrier; each of the stanchion members comprises upper and lower stanchion parts which may be fabricated of the same or different materials and which are secured to the associated vehicle roof by fastening elements which extend generally vertically downwardly through the stanchion parts into the roof surface. A utility bar may be associated with laterally aligned pairs of stanchion members and be secured to the rack by means of the same fastening elements securing the upper and lower stanchion parts to the vehicle surface.

15 Claims, 6 Drawing Figures

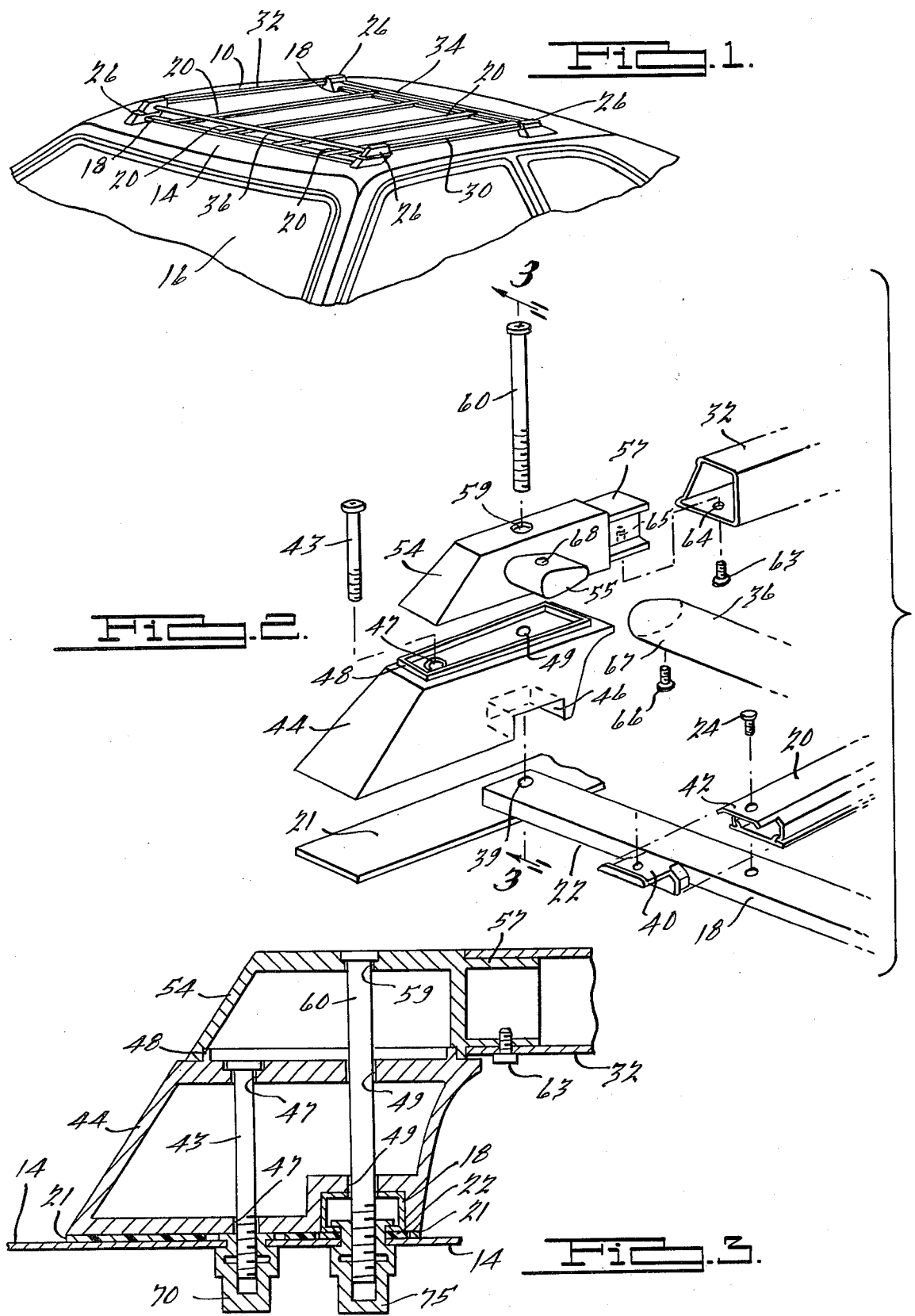

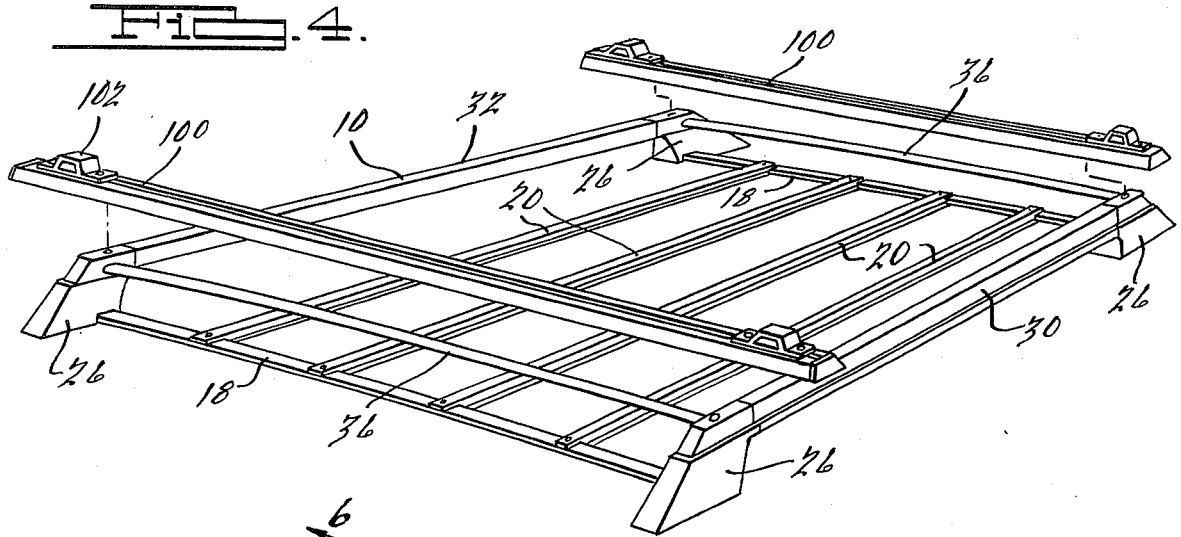
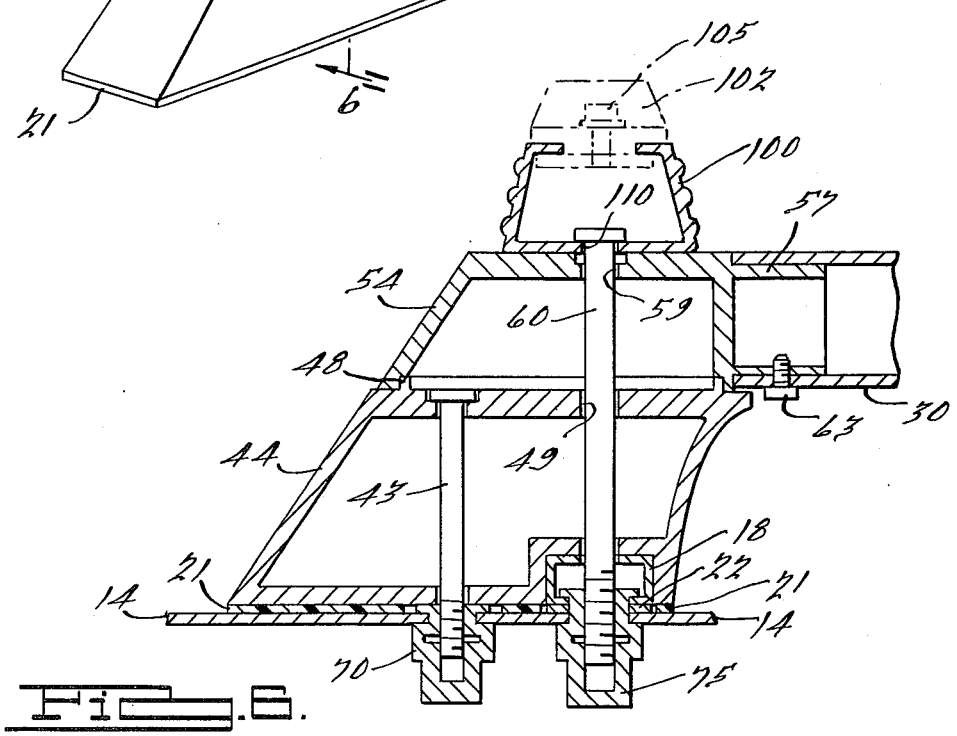

VEHICLE LUGGAGE RACK

This is a continuation, of application Ser. No. 13,524, filed Feb. 21, 1979, now abandoned.

BACKGROUND AND SUMMARY OF THE INVENTION

The present invention is generally directed toward a new and improved vehicle luggage rack or carrier of the type comprising a pair of longitudinally spaced, laterally extending crossrails, and a pair of laterally spaced longitudinally extending side rails, the adjacent ends of the side and crossrails being supported at each of the four corners of the luggage rack by means of a stanchion member, which stanchion members are constructed in accordance with the principles of the present invention. In particular, the stanchion members each comprise upper and lower stanchion parts which are adapted to be fabricated of the same or different materials, depending upon the particular application of the luggage rack, with the upper stanchion parts including mounting bosses which are adapted for telescopic engagement with the confronting ends of the side and crossrails for supporting the rails upon the vehicle. The upper stanchion part of each of the stanchion members is secured to the associated lower stanchion part by a single fastening element in the form of a threaded screw, bolt or the like which extends generally vertically downwardly through the lower stanchion part into the associated vehicle roof. The luggage rack is preferably provided with a plurality of luggage supporting slats which are also intended to be secured to the vehicle roof by the same fastening elements which secure the upper stanchion parts to the associated lower stanchion parts. An additional feature of the present invention resides in the fact that utility bars may be provided at the forward and rearward ends of the luggage rack and be secured thereto by the aforementioned fastening members, thereby minimizing the component parts of the present invention to the extreme.

It is accordingly a general object of the present invention to provide a new and improved luggage rack or carrier having a plurality of stanchion members, each of which comprises upper and lower stanchion parts or sections which may be fabricated of the same or different materials.

It is a related object of the present invention to provide a new and improved luggage carrier of the abovedescribed type wherein the upper stanchion parts of each of the stanchion members includes means for supporting the associated side and crossrails of the luggage carrier.

It is a further object of the present invention to provide a new and improved luggage carrier, as above described, wherein the upper stanchion part of each of the stanchion members is secured to the associated lower stanchion part by means of a single fastening element.

It is a further object of the present invention to provide a new and improved luggage carrier of the abovedescribed type which may be operatively associated with utility bars that extend generally laterally of the luggage rack and are secured to the stanchion members by the same fastening means securing the upper stanchion parts to the associated lower stanchion parts, whereby the luggage rack may be adapted to carry relatively large or bulky loads, such as ladders, boats, large parcels, etc.

It is still another object of the present invention to provide a new and improved luggage carrier of the abovedescribed type wherein the number of different component parts required for the entire assemblage is minimized to the extreme so as to reduce tooling and inventory costs accordingly.

It is still another object of the present invention to provide a new and improved luggage carrier which is of a pleasant appearance, is economical to manufacture and will have a long and effective operational life.

Other objects and advantages of the present invention will become apparent from following detailed description taken in conjunction with the accompanying drawings.

BRIEF DESCRIPTION OF THE DRAWINGS

FIG. 1 is an elevated perspective view of a portion of an automotive vehicle having the new and improved vehicle luggage carrier of the present invention in operative association therewith;

FIG. 2 is an exploded assembly view of one corner portion of the luggage carrier illustrated in FIG. 1;

FIG. 3 is an enlarged fragmentary cross-sectional view of one of the stanchion members embodied in the luggage carrier of the present invention.

FIG. 4 is an elevated perspective view of an alternate embodiment of the luggage carrier of the present invention;

FIG. 5 is an elevated fragmentary perspective view of one of the stanchion members embodied in the luggage carrier shown in FIG. 4; and FIG. 6 is an enlarged cross-sectional view similar to FIG. 3 of the embodiment of the luggage carrier of the present invention shown in FIGS. 4 and 5.

DESCRIPTION OF THE PREFERRED EMBODIMENTS

Referring now in detail to the drawings and in particular to FIG. 1 thereof, a vehicle luggage rack or carrier 10, in accordance with one preferred embodiment of the present invention, is shown in operative association with an automotive vehicle 12 having a substantially flat roof portion 14 extending rearwardly of the vehicle windshield 16. The luggage rack 10 includes a pair of longitudinally spaced, laterally extending load supporting slats 18 and a plurality of longitudinally extending, laterally spaced load supporting slats 20, which slats 18, 20 are disposed directly adjacent the upper surface of the roof portion 14 and are intended to underlie luggage or other articles which are carried by the rack 10, in a manner well known in the art. The luggage rack 10 of the present invention also includes a pair of identical, longitudinally extending, laterally spaced tubular side rails 30 and 32 which are secured at the longitudinally opposite ends thereof to a plurality of four stanchions, generally designated by the numeral 26, that are located one at each of the four corners of the rack 10. A pair of longitudinally spaced, laterally extending crossrails 34, 36 extend transversely between and are secured at the laterally opposite ends to the stanchions 26 in a manner hereinafter to be described. The stanchions 26 are fixedly secured upon the vehicle roof portion 14 in a manner hereinafter to be described.

As best seen in FIG. 2, the laterally extending slats 18 will be seen to be supported upon the upper surface of the roof 14 by means of suitable relatively resilient or compliant support pads, generally designated by the numeral 22. In a similar manner, the plurality of longitudinally extending slats 20 are spaced from the upper surface of the roof 14 by means of suitable pads 23. The longitudinally opposite ends of the slats 20 are fixedly secured to the laterally extending slats 18 by means of suitable fastening members, such as threaded screw fasteners 24 which extend downwardly through longitudinally extending flange portions 42 provided at the opposite ends of the slats 20 and are threadably secured within suitable apertures within the slats 18. Preferably, the opposite ends of the longitudinally extending slats 20 are provided with end fittings 40 which are interposed between the ends of the slats 20 and the transverse slats 18 and are provided with raised shoulders around the periphery thereof to afford protection against any sharp edges which may be prevalent on the flange portions 42 and to provide a pleasant appearing connection between the slats 18, 20. The laterally opposite ends of each of the cross slats 18 is provided with a suitable aperture 39 (see FIG. 2) which functions in a manner hereinafter to be described in providing a means for securing the assemblage consisting of the slats 18, 20 and the plurality of stanchions 26 upon the vehicle roof 14.

In accordance with the principles of the present invention, each of the stanchions 26 consists of an upper stanchion part 54 and a lower stanchion part 44. The stanchion construction is best illustrated in FIGS. 2 and 3 wherein it will be seen that the lower stanchion part 44 of each of the stanchions 26 is of a generally hollow construction and is provided with a pair of spaced apart apertures or bores 47 and 49 which extend vertically the entire distance through the stanchion parts 44. The lower laterally inboard side of each of the stanchion parts 44 is provided with a generally rectangular-shaped notch or recess 46 which is aligned with the aperture 49 and adapted to nestingly receive the laterally outer end of the associated of the slats 18 in a manner such that the aperture 39 in said adjacent or associated slat 18 is aligned with the aperture 49, whereby a single fastening element which functions to secure the associated upper stanchion part 54 to the lower stanchion part 44 also serves to secure the adjacent end of the slat 18 to the vehicle roof 14. Each of the lower stanchion parts 14 is also adapted to be secured to the roof 14 atop a suitable resilient pad 21 by means of a fastening element 43 in the form of a suitable threaded screw, bolt or the like which extends downwardly through the apertures 47. The upper end of the aperture 47 is preferably countersunk, whereby the bolt head may be arranged flush with the upper surface of the lower stanchion part 44 and below a generally rectangular-shaped positioning shoulder 48 formed integrally of the upper surface thereof which functions to orient or position the upper stanchion part 54 thereupon during assembly of the luggage rack 10 of the present invention.

As also best illustrated in FIGS. 2 and 3, the upper stanchion part 54 of each of the stanchions 26 is provided with a relatively flat upper surface and is of a generally hollow construction consistent with the desired economies of weight and material for modern automotive vehicles. Each of the upper stanchion parts 54 is provided with a suitable vertically extending bore 59 which, when the part 54 is mounted upon the associated lower part 44, is aligned with the bore 49 therein, whereby a suitable fastening means in the form of a threaded bolt 60 may extend downwardly through the bore 59 and aligned bores 49 and 39 of the lower stanchion part 44 and associated slat 18, respectively. Preferably, the upper end of the bore 59 is countersunk, whereby the head of the bolt 60 may be flush with the upper surface of the upper stanchion part 54.

Each of the upper stanchion parts 54 is provided with a longitudinally extending shoulder or boss 57 which is adapted for telescopic engagement interiorly of the adjacent end of one of the longitudinally extending side rails 32, with means in the form of a suitable screw, bolt or the like 63 extending upwardly through a suitable bore 64 in the adjacent end of the side rail 32 for securing the side rails 32 to the mounting boss 57. In a similar manner, each of the upper stanchion parts 54 is provided with a laterally inwardly extending mounting boss 55 which is adapted for telescopic engagement interiorly of the adjacent end of the associated crossrail 36. Preferably, the cross-sectional shape of the mounting bosses 57 and 55 are complementary with respect to the cross-sectional shapes of the interior of the rails 32 and 36, and means in the form of a suitable screw, bolt or the like 66 extending upwardly through a suitable aperture 67 is employed for fixedly securing the opposite ends of the crossrails 36 to the mounting bosses 55. The lower ends of the bolts 43, 60 of each of the stanchions 26 may be secured to the roof 14 by any suitable means, for example, by means of threaded fastening members known in the art as riv-nuts and identified in the drawings by the numerals 70 and 75, respectively. Of course, various alternative fastening means which cooperate with the bolts 43, 60 may be utilized without departing from the scope of the present invention.

A particular feature of the present invention resides in the fact that with the exception of the upper stanchion parts 54, all duplicate components of the luggage rack 10 are interchangeable and in fact, only two different upper stanchion parts 54 are required, whereby to provide a significant amount of manufacturing flexibility and a correlative reduction in inventory and tooling costs. Additionally, it will be noted that if it is necessary to rotatably position the respective crossrails 36 about their longitudinal axis in order to compensate for wind noise on different types of vehicles, it is only necessary to "re-tool" the upper stanchion parts 54 having the mounting bosses 55 arranged at a different angle instead of having to re-tool the entire stanchions 26. Moreover, by having each of the stanchions 26 fabricated of two different components, namely, the upper part 54 and lower part 44, different materials may be used for each of these parts, such as die-cast metal and injection molded plastics, for example, whereby to provide for universality of application and a wide diversity of appearances in order to best complement the aesthetics of the associated vehicle. Still another feature of the present invention resides in the fact that the assemblage consisting of the slats 18, 20 are secured to the luggage rack 10 by means of the same fastening elements, i.e. bolts 60, which secure the stanchions 26 to the vehicle roof, thereby minimizing the number of different fastening means required.

FIGS. 4-6 illustrate an alternate embodiment of the present invention wherein the luggage rack 10 is provided with a pair of transversely or laterally extending utility bars, generally designated 100, which are adapted to be mounted upon and secured to ethe stanchions 26. In particular, a pair of the utility bars 100 are intended to be mounted upon and extend between the laterally aligned pairs of stanchions 26, the bars 100 being secured upon the stanchions 26 by means of the aforementioned fastening elements or bolts 60. Typically, such utility bars are used for securing large boxes and other cargo within or upon the luggage rack and/or securing other relatively large or bulky articles, such as ladders, boats, surfboards, bicycles, etc., upon the luggage rack 10. If desired, the utility bars may be provided with suitable tie-down members 102 which aresecured to the bars 100 by fastening means, such as bolts 105, in FIG. 5. Typically, such bolts 105 are threadably engaged with a tapping plate which is disposed interiorly of the associated utility bar 100, as is indicated in phantom lines in FIG. 6, whereby to permit the tie-down members 102 to be moved laterally of the luggage rack 10, i.e., longitudinally of the utility bars 100, in order to obtain optimum positioning thereof for securing the associated cargo upon the luggage rack 10. As will be seen in FIG. 6, the utility bars 100 are provided with suitable bores in the underside thereof, as is indicated at 110, through which the bolts 60 may extend once the apertures 110 are aligned with the apertures 59 on the upper stanchion parts 54. It is to be noted that for certain applications, the utility bars 100 may extend laterally outwardly beyond the stanchions 26 a predetermined amount so that the luggage rack 10 may be adapted to carry relatively large and wide loads, such as boats, bicycle racks, etc., which might not be possible in a situation wherein the utility bars were of a length only as wide as the luggage rack 10 per se.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

I claim:

1. In a luggage carrier for supporting luggage and the like on an automotive vehicle,
    a stanchion assembly comprising an upper stanchion part having means for supporting one end of a luggage constraining rail, and a lower stanchion part disposed at least in part below said upper stanchion part, said upper stanchion part having an upper surface capable of being operably associated with additional means for constraining articles;
    first generally vertically oriented fastening means for operatively securing said upper and lower stanchion parts together and operably disposed to be capable of securing additional means for constraining articles to said stanchion assembly; and
    second generally vertically oriented fastening means for securing said lower stanchion part to said vehicle concealed by said upper stanchion part when said upper and lower stanchion parts are operatively assembled, wherein said lower stanchion part is still secured to said vehicle when said first fastening means is unfastened.

2. The invention as set forth in claim 1 wherein said stanchion assembly includes means for supporting one end of a longitudinally extending side rail.

3. The invention as set forth in claim 1 wherein said stanchion assembly includes means for supporting one end of a transversely extending crossrail.

4. The invention as set forth in claim 1 which includes first means for supporting one end of a longitudinally extending side rail and second means for supporting one end of a transversely extending crossrail.

5. The invention as set forth in claim 1 wherein one of said stanchion parts includes means matingly engageable with the other of said stanchion parts.

6. The invention as set forth in claim 1 wherein said fastening means comprises a generally vertically oriented threaded fastener.

7. The invention as set forth in claim 6 which includes a second threaded fastener for securng said lower stanchion part to the roof, and wherein said first mentioned threaded fastener extends generally vertically through both said upper and said lower stanchion parts.

8. The invention as set forth in claim 1 wherein said means for supporting one end of a luggage constraining rail comprises an integral mounting boss on said upper stanchion part.

9. The invention as set forth in claim 1 wherein said means for supporting a luggage constraining rail comprises a generally longitudinally extending mounting boss on one end of said upper stanchion part and a generally laterally extending mounting boss also formed on said upper stanchion part for supporting a second luggage constraining rail.

10. The invention as set forth in claim 1 which includes a utility bar having means thereon for attachment to said stanchion assembly and cooperable with said fastening means.

11. The invention as set forth in claim 1 which includes a luggage supporting slat located adjacent the upper surface of the vehicle roof and adapted to be secured thereto by said fastening means.

12. A rack for carrying luggage and the like on automotive vehicles comprising:
    a pair of longitudinally extending laterally spaced side rails,
    a pair of laterally extending longitudinally spaced crossrails,
    a plurality of stanchion members for supporting said side rails and crossrails upon the vehicle,
    at least two of said stanchion members comprising a lower stanchion part which is operatively secured to the vehicle roof and an upper stanchion part having means for supporting the adjacent ends of said side and crossrails, said upper stanchion part having an upper surface capable of being operably associated with additional means for constraining articles;
    a first fastening element extending generally vertically downwardly through said upper and lower stanchion parts of each of said two mentioned stanchion members for securing said parts upon the vehicle and operably disposed to be capable of securing additional means for constraining articles to said stanchion assembly; and
    a second fastening element extending generally vertically through said lower stanchion part to secure said lower stanchion part upon the vehicle,
    wherein said lower stanchion part is still secured to said vehicle when said first fastening element is unfastened.

13. The invention as set forth in claim 12 which includes a utility bar extending laterally between said two mentioned stanchion members, said utility bar comprising means cooperable with said single fastening means on each of said stanchion members for securing said bar to said luggage rack.

14. The invention as set forth in claim 13 which includes at least one luggage supporting slat disposed adjacent the upper roof surface and cooperable with said single fastening means of one of said two mentioned stanchion members for securing said slat upon said vehicle roof.

15. The invention as set forth in claim 12 wherein said luggage rack comprises four stanchion members, each of said members comprising upper and lower stanchion parts, the lower stanchion parts of each of said stanchion members being securing by a first fastening member to the vehicle roof and each of said stanchion members comprising another fastening member extending generally vertically downwardly through said upper and lower stanchion parts thereof and threadably engageable with means on the vehicle roof for securing said stanchion members thereto, each of the upper stanchion parts comprising a longitudinally extending mounting boss cooperable with one end of one of said longitudinally extending side rails and each of said upper stanchion parts further comprising a laterally inwardly extending mounting boss cooperative with one end of one of said laterally extending crossrails for securing said side rails and crossrails upon the vehicle.

* * * * *

UNITED STATES PATENT AND TRADEMARK OFFICE
CERTIFICATE OF CORRECTION

PATENT NO. : 4,342,411

DATED : August 3, 1982

INVENTOR(S) : John A. Bott

It is certified that error appears in the above-identified patent and that said Letters Patent is hereby corrected as shown below:

Column 1, line 51, "abovedescribed should read -- above-described --.

Column 1, line 63, "abovedescribed should read -- above-described --.

Column 2, line 5, "abovedescribed should read -- above-described --.

Column 2, line 27, "." should read -- ; --.

Column 7, line 6, Claim 15, "parts" (second occurrence) should read -- part --.

Signed and Sealed this

Tenth Day of May 1983

[SEAL]

Attest:

GERALD J. MOSSINGHOFF

Attesting Officer   Commissioner of Patents and Trademarks